US011461101B2

(12) United States Patent
Li et al.

(10) Patent No.: US 11,461,101 B2
(45) Date of Patent: Oct. 4, 2022

(54) CIRCUITRY AND METHOD FOR SELECTIVELY CONTROLLING PREFETCHING OF PROGRAM INSTRUCTIONS

(71) Applicant: Arm Technology (China) Co. LTD, Shenzhen (CN)

(72) Inventors: Chi-Ming Li, Hsinchu (TW); Chi-Chang Lai, Hsinchu (TW)

(73) Assignee: ARM TECHNOLOGY (CHINA) CO. LTD, Shenzhen (CN)

( * ) Notice: Subject to any disclaimer, the term of this patent is extended or adjusted under 35 U.S.C. 154(b) by 23 days.

(21) Appl. No.: 16/585,387

(22) Filed: Sep. 27, 2019

(65) Prior Publication Data
US 2021/0096868 A1  Apr. 1, 2021

(51) Int. Cl.
*G06F 9/38* (2018.01)
*G06F 12/0875* (2016.01)
*G06F 12/0862* (2016.01)

(52) U.S. Cl.
CPC ........ *G06F 9/3804* (2013.01); *G06F 12/0862* (2013.01); *G06F 12/0875* (2013.01); *G06F 2212/452* (2013.01)

(58) Field of Classification Search
CPC .. G06F 9/3806; G06F 9/3804; G06F 12/0862; G06F 2212/6024–6028; G06F 9/3004; G06F 12/0875
See application file for complete search history.

(56) References Cited

U.S. PATENT DOCUMENTS

2006/0294356 A1  12/2006 Kumar et al.
2009/0210663 A1*  8/2009 Sartorius ............... G06F 9/3804
712/207
(Continued)

FOREIGN PATENT DOCUMENTS

CN  1484157 A  3/2004
CN  1517884 A  8/2004
(Continued)

OTHER PUBLICATIONS

International Search Report and Written Opinion issued in PCT/IB2020/058954 dated Jan. 15, 2021.

*Primary Examiner* — Courtney P Carmichael-Moody
(74) *Attorney, Agent, or Firm* — Foley & Lardner LLP

(57) ABSTRACT

Circuitry comprises processing circuitry to process program instructions, in which the program instructions are stored by storage circuitry and the processing circuitry comprises execute-in-place processing circuitry configured to execute the program instructions from the storage circuitry; a prefetch buffer to store program instructions for execution by the processing circuitry; prefetch circuitry to control prefetching of program instructions to the prefetch buffer and to select a next instruction for prefetching; and replacement circuitry to control deletion of instructions from the prefetch buffer to provide storage for newly prefetched program instructions; in which one or both of the prefetch circuitry and the replacement circuitry are configured so that one or both of a selection operation by the prefetch circuitry of a next program instruction for prefetching, and a deletion operation to delete an instruction from the prefetch buffer by the replacement circuitry is dependent upon previously executed program instructions and a prediction of future program instructions to be executed.

12 Claims, 6 Drawing Sheets

(56) References Cited

U.S. PATENT DOCUMENTS

| | | | |
|---|---|---|---|
| 2010/0262750 A1* | 10/2010 | Deshpande | G06F 12/0862 711/3 |
| 2012/0066455 A1* | 3/2012 | Punyamurtula | G06F 12/0862 711/122 |
| 2014/0173217 A1* | 6/2014 | Kalamatianos | G06F 12/0862 711/137 |
| 2014/0258622 A1 | 9/2014 | Lacourba et al. | |
| 2017/0083337 A1* | 3/2017 | Burger | G06F 9/3859 |
| 2017/0091104 A1* | 3/2017 | Rafacz | G06F 12/0862 |
| 2017/0199739 A1* | 7/2017 | Kitchin | G06F 9/3806 |

FOREIGN PATENT DOCUMENTS

| | | |
|---|---|---|
| CN | 101630291 A | 1/2010 |
| CN | 104932876 A | 9/2015 |

* cited by examiner

| Branch Prediction | Cache Lookup | Prefetch Buffer Lookup | Current Mobility | Next Mobility |
|---|---|---|---|---|
| 400 Strong | Miss | Miss | — | Higher |
| 410 Weak | Miss | — | — | Same |
| 420 Strong | Hit | — | — | Lower |
| 430 Strong | Miss | Hit | — | Same |

FIG. 4

| Execution Trace | Cache/Prefetch Buffer Lookup | Cache Eviction | Current Stickiness | Next Stickiness |
|---|---|---|---|---|
| Prediction Hit | Miss/Hit | Yes | - | Higher |
| Prediction Miss | Miss/Hit | Yes | - | Same |
| - | Miss/Miss | Yes | - | Lower |
| - | Miss/Miss | No | - | Higher |

CIRCUITRY AND METHOD FOR SELECTIVELY CONTROLLING PREFETCHING OF PROGRAM INSTRUCTIONS

BACKGROUND

This disclosure relates to circuitry and methods.

So-called "execute in place" ("XIP") operation can refer to a technique in the field of processing circuitry such as microprocessors in which program instructions are executed from their location in a main storage—for example a non-volatile memory or other storage (such as a disk storage) or more generally a memory or storage circuitry which requires a non-trivial latency and/or power to access. This can avoid the need to copy the whole of a program from the main storage to a working memory such as a random access memory (RAM).

In order to mitigate the latency and/or power requirements mentioned above, a so-called XIP prefetch buffer may be employed. The XIP prefetch buffer, with associated prefetch circuitry, provides an intermediate storage of a subset of the contents of the main storage, according to a prediction of which addresses are likely to be needed next for the execution of program instructions.

SUMMARY

In an example arrangement there is provided circuitry comprising:

processing circuitry to process program instructions, in which the program instructions are stored by storage circuitry and the processing circuitry comprises execute-in-place processing circuitry configured to execute the program instructions from the storage circuitry;

a prefetch buffer to store program instructions for execution by the processing circuitry;

prefetch circuitry to control prefetching of program instructions to the prefetch buffer and to select a next instruction for prefetching; and replacement circuitry to control deletion of instructions from the prefetch buffer to provide storage for newly prefetched program instructions;

in which one or both of the prefetch circuitry and the replacement circuitry are configured so that one or both of a selection operation by the prefetch circuitry of a next program instruction for prefetching, and a deletion operation to delete an instruction from the prefetch buffer by the replacement circuitry is dependent upon previously executed program instructions and a prediction of future program instructions to be executed.

In another example arrangement there is provided circuitry comprising:

processing circuitry to process program instructions, in which the program instructions are stored by storage circuitry and the processing circuitry comprises execute-in-place processing circuitry configured to execute the program instructions from the storage circuitry;

a prefetch buffer to store program instructions for execution by the processing circuitry;

prefetch circuitry to control prefetching of program instructions to the prefetch buffer; and replacement circuitry to control deletion of instructions from the prefetch buffer to provide storage for newly prefetched program instructions in which:

the processing circuitry comprises a cache memory;

the prefetch circuitry is configured to receive cache operation information from the processing circuitry, the cache operation information indicating at least a subset of operations for the cache memory; and one or both of the prefetch circuitry and the replacement circuitry are configured so that one or both of a selection operation by the prefetch circuitry of a next program instruction for prefetching, and a deletion operation to delete an instruction from the prefetch buffer by the replacement circuitry is dependent upon the cache operation information.

In another example arrangement there is provided a method comprising:

processing program instructions, in which the program instructions are stored by storage circuitry and the processing step comprises executing the program instructions in place from the storage circuitry;

storing in a prefetch buffer, program instructions for execution by the processing step;

prefetching program instructions to the prefetch buffer, the prefetching step including selecting a next instruction for prefetching; and deleting instructions from the prefetch buffer to provide storage for newly prefetched program instructions;

in which one or both of the selecting step and the deleting step is dependent upon previously executed program instructions and a prediction of future program instructions to be executed.

In another example arrangement there is provided a method comprising:

processing program instructions, in which the program instructions are stored by storage circuitry and the processing step comprises executing the program instructions in place from the storage circuitry and storing program instructions for execution in a cache memory;

storing in a prefetch buffer, program instructions for execution by the processing step;

prefetching program instructions to the prefetch buffer, the prefetching step comprising selectively controlling prefetching of program instructions from a set of one or more addresses; and deleting instructions from the prefetch buffer to provide storage for newly prefetched program instructions;

in which:

the prefetching step comprises receiving cache operation information indicating at least a subset of operations for the cache memory; and one or both of the prefetching step and the deleting step is dependent upon the cache operation information.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 4 and 5 schematically illustrate aspects of the operation of the circuitry of FIG. 3.

DESCRIPTION OF EMBODIMENTS

Figure 1:
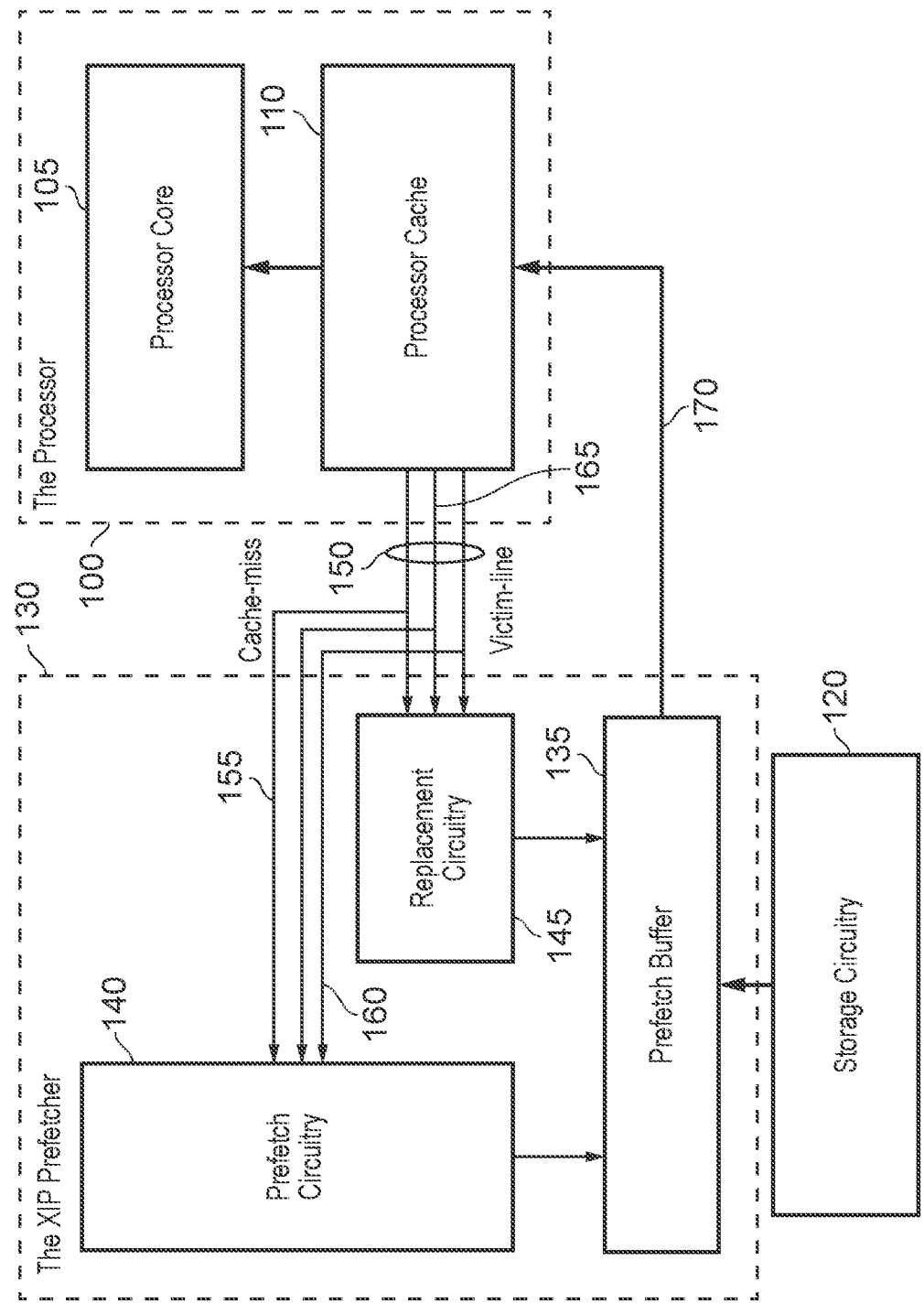
FIGS. 1 to 3 schematically illustrate examples of circuitry.

Before discussing the embodiments with reference to the accompanying figures, the following description of embodiments is provided.

An example embodiment provides circuitry comprising:

processing circuitry to process program instructions, in which the program instructions are stored by storage circuitry and the processing circuitry comprises execute-in-place processing circuitry configured to execute the program instructions from the storage circuitry;

a prefetch buffer to store program instructions for execution by the processing circuitry;

prefetch circuitry to control prefetching of program instructions to the prefetch buffer and to select a next instruction for prefetching; and replacement circuitry to control deletion of instructions from the prefetch buffer to provide storage for newly prefetched program instructions;

in which one or both of the prefetch circuitry and the replacement circuitry are configured so that one or both of a selection operation by the prefetch circuitry of a next program instruction for prefetching, and a deletion operation to delete an instruction from the prefetch buffer by the replacement circuitry is dependent upon previously executed program instructions and a prediction of future program instructions to be executed.

Example embodiments can provide a prefetch arrangement in the context of XIP operation by processing circuitry in which previously executed program instructions and a prediction of future program instructions to be executed are used to influence, vary or otherwise affect one or both of the choice of which instructions (or more generally which storage addresses) to be prefetched and the choice of which previously-prefetched instructions (or more generally, addresses) to delete in order to make space available for a next-prefetched instruction or memory address. In some examples, both of these operational features may be dependent upon previously executed program instructions and a prediction of future program instructions to be executed.

In example arrangements this can lead to one or more of: a more energy-efficient XIP buffer by potentially more accurately predicting which addresses to prefetch and/or more accurately re-using previously prefetched information, and/or a higher performance XIP buffer by increasing a hit rate amongst prefetched information. The techniques of the example embodiments are readily adoptable within circuitry designs.

In some examples, the prefetch circuitry is configured to receive program flow prediction information from the processing circuitry, the program flow prediction information indicating at least a predicted next instruction address (such as a branch prediction indicating a predicted branch target or destination); and the prefetch circuitry is configured to selectively control prefetching of program instructions from a set of one or more addresses starting at the predicted next instruction address. This provides for an efficient further use of the prediction information by influencing the operation of an XIP prefetcher. For example, as mentioned above the program flow prediction information comprises one or more of:

branch prediction information indicating a branch target address; and program counter information indicating one or more next successive program instructions.

In some example embodiments the processing circuitry comprises a cache memory; the prefetch circuitry is configured to receive cache operation information from the processing circuitry, the cache operation information indicating at least a subset of operations for the cache memory; and the prefetch circuitry is configured to selectively control prefetching of program instructions from a set of one or more addresses in dependence upon the cache operation information. The present disclosure recognises that various types of cache information can be useful when applied to control or influence the operation of an XIP prefetcher. For example, the cache operation information may indicate at least one of:

unsuccessful cache retrieval operations by the processing circuitry;

cache eviction operations to evict currently stored contents of the cache memory;

successful cache retrieval operations by the processing circuitry; and a cache replacement control state.

In example embodiments the prefetch circuitry may be configured to generate a respective weighting for each of at least (i) a first candidate next program instruction for prefetching based on the program flow prediction information and (ii) a second candidate next program instruction for prefetching based on the cache operation information, and to selectively control prefetching in dependence upon one of the first and second candidate next program instructions for prefetching in dependence upon the respective weightings.

Example embodiments employ circuitry (such as circuitry which may be referred to as a so-called "locality profiler") as a region controller to generate a current address region (which may be referred to as a "locality realm") having at least a threshold probability of containing one or more next program instructions in dependence upon one or both of:

the cache operation information; and the program flow information.

The current address region or locality realm can then conveniently be used in the controlling of the operation of the XIP prefetcher. For example, the region controller may be configured to generate a first probability value (or "mobility") indicative of the probability that the current address region changes in response to a given prefetch operation; and the region controller may be configured to vary the respective weightings associated with the first and second candidate next program instructions for prefetching in dependence upon the first probability value. In example arrangements the region controller is configured to adjust the first probability value applicable to a next prefetching operation in response to a current instance of the program flow prediction information and the cache operation information. In other (or overlapping) examples the region controller is configured to generate a second probability value (or "stickiness") indicative of the probability that one or both of a newly prefetched program instruction and a program instruction evicted from the cache lies within the current address region; and the region controller is configured to vary the respective weightings associated with the first and second candidate next program instructions for prefetching in dependence upon the second probability value. An example use of this information is that the region controller may be configured to adjust the second probability value applicable to a next prefetching operation in response to a current instance of the program flow prediction information and the cache operation information.

Although cache operation may be on an instruction-by-instruction basis, in example embodiments the cache memory is configured to store and to evict program instructions as groups of program instructions (for example, contiguously addressed groups or groups having a most significant portion of their addresses in common, for example so-called "cache lines"); and the prefetch circuitry is configured to prefetch program instructions as groups of program instructions.

A further use of the so-called mobility and/or stickiness metrics is that in example embodiments the region controller is configured to provide one or both of the first and second probability values to the cache memory; and the cache memory is configured to vary its operation in response to the received one or both of the first and second probability values. As an example of such a feature, in examples, for a second probability value of at least a threshold probability, the cache memory is configured not to cache a program instruction in the current address region. In an additional or alternative example arrangement, the cache memory is configured to vary a replacement algorithm controlling replacement of program instructions stored in the cache memory in response to the first probability value.

In general the storage may be a memory or storage circuitry which requires a non-trivial latency and/or power to access. For example, the storage circuitry may be non-volatile storage circuitry.

Another example embodiment provides circuitry comprising:

processing circuitry to process program instructions, in which the program instructions are stored by storage circuitry and the processing circuitry comprises execute-in-place processing circuitry configured to execute the program instructions from the storage circuitry;

a prefetch buffer to store program instructions for execution by the processing circuitry;

prefetch circuitry to control prefetching of program instructions to the prefetch buffer; and replacement circuitry to control deletion of instructions from the prefetch buffer to provide storage for newly prefetched program instructions in which:

the processing circuitry comprises a cache memory;

the prefetch circuitry is configured to receive cache operation information from the processing circuitry, the cache operation information indicating at least a subset of operations for the cache memory; and one or both of the prefetch circuitry and the replacement circuitry are configured so that one or both of a selection operation by the prefetch circuitry of a next program instruction for prefetching, and a deletion operation to delete an instruction from the prefetch buffer by the replacement circuitry is dependent upon the cache operation information.

Another example embodiment provides a method comprising:

processing program instructions, in which the program instructions are stored by storage circuitry and the processing step comprises executing the program instructions in place from the storage circuitry;

storing in a prefetch buffer, program instructions for execution by the processing step;

prefetching program instructions to the prefetch buffer, the prefetching step including selecting a next instruction for prefetching; and deleting instructions from the prefetch buffer to provide storage for newly prefetched program instructions;

in which one or both of the selecting step and the deleting step is dependent upon previously executed program instructions and a prediction of future program instructions to be executed.

Another example embodiment provides a method comprising:

processing program instructions, in which the program instructions are stored by storage circuitry and the processing step comprises executing the program instructions in place from the storage circuitry and storing program instructions for execution in a cache memory;

storing in a prefetch buffer, program instructions for execution by the processing step;

prefetching program instructions to the prefetch buffer, the prefetching step comprising selectively controlling prefetching of program instructions from a set of one or more addresses; and deleting instructions from the prefetch buffer to provide storage for newly prefetched program instructions;

in which:

the prefetching step comprises receiving cache operation information indicating at least a subset of operations for the cache memory; and one or both of the prefetching step and the deleting step is dependent upon the cache operation information.

Referring now to the drawings, FIG. 1 schematically illustrates circuitry comprising processing circuitry 100 having a processor core 105 and a processor cache 110. The processing circuitry 100 is arranged to process program instructions in which the program instructions are stored by storage circuitry 120 and the processing circuitry 100 comprises execute-in-place ("XIP") processing circuitry to execute the program instructions from the storage circuitry 120, which is to say without the need to copy or move the program instructions to an intermediate memory such as a random access memory (RAM) for execution.

The storage circuitry 120 may be, for example, a non-volatile storage circuitry such as a flash memory or a disk-based storage circuitry, but in general for the purposes of this discussion, the storage circuitry 120 has a non-negligible latency and/or power cost associated with accessing information stored by the storage circuitry 120.

The circuitry of FIG. 1 also includes a so-called XIP prefetcher 130 which serves to prefetch information such as program instructions from the storage circuitry 120 ready for execution by the processing circuitry 100. The XIP prefetcher 130 aims to prefetch the appropriate instructions which will next be required for execution, so as to avoid latency issues during execution while the system attempts to retrieve a next instruction from the storage circuitry 120. The XIP prefetcher 130 comprises a prefetch buffer 135 to store program instructions for execution by the processing circuitry, prefetch circuitry 140 to control prefetching of program instructions to the prefetch buffer and as part of this, to select a next instruction for prefetching, replacement circuitry 145 to control deletion of instructions from the prefetch buffer 135 to provide storage for newly prefetched program instructions.

In operation, the prefetch circuitry (and in the example of FIG. 1, the replacement circuitry) is configured to received cache operation information 150 from the processing circuitry (for example, from the processor cache 110), the cache operation information indicating at least a subset of operations for the cache memory or processor cache 110. The prefetch circuitry is configured to selectively control prefetching of program instructions from a set of one or more addresses (at the storage circuitry 120) in dependence upon the cache operation information.

Note that the processor cache may be configured to store and to evict program instructions as groups of program instructions, and the prefetch circuitry may be configured to prefetch program instructions as groups of program instructions. Such a group may represent a so-called cache line (for example a group of addresses having a most significant portion of their address in common).

Examples of the cache operation information include information indicating at least one of the following:

Unsuccessful cache retrieval operations by the processing circuitry (in other words, cache misses 155);

Cache eviction operations to evict currently stored contents of the cache memory (for example, information identifying a so-called victim line for eviction 160;

Successful cache retrieval operations by the processing circuitry; and

A cache replacement control state.

The latter two types of cache operation information are shown schematically as information 165 in FIG. 5.

The XIP prefetcher 130 can be arranged to steer the prefetch circuitry 140 and/or the replacement circuitry 145 dynamically so as to implement or at least be more likely to implement victim prefetch or cache-miss-prefetch. Here victim prefetch is a prefetch action based upon the information 160 indicating information on a victim line such as a victim line address or attribute. Cache miss prefetch is a prefetch action based on cache miss information 155 such as a missed address or attribute.

In other words, the XIP prefetcher 130 may perform one or both of: (a) obtaining or retaining in the prefetch buffer program 135 instructions which have been requested by the processor core 105 from the processor cache 110 but which were missing from the processor cache; and (b) obtaining or retaining in the prefetch buffer 135 program instructions which have been deleted from the processor cache 110.

Note that a data path 170 is provided from the prefetch buffer 135 to the processor cache 110 so that the processor cache 110 can obtain program instructions (which are held by the prefetch buffer 135) from the prefetch buffer 135.

In this way, the circuitry of FIG. 1 and in particular the XIP prefetcher 120 (in common with other embodiments to be described below) attempts to prefetch data which will be accessed in the future and to keep useful data as long as possible.

With regard to cache misses, in order to reduce cache-miss latency, which is a significant feature of execute-in-place technology, the aim of the circuitry of FIG. 1 is to predict and prefetch a potential miss line into the prefetch buffer 135 in good time. It is noted that cache misses may fall into various categories. A so-called cold miss relates to first time reference to a cache line and can be mitigated in the present apparatus by a sequential prefetch of successive program instructions. A cache capacity miss occurs when the cache size is smaller than the amount of information it is required to store for execution of the current code. A cache conflict miss can occur when multiple cache lines occur within a set-associative cache structure. Embodiments to be described below can attempt to identify the type of cache miss and its association with program flow in order to steer the prefetching of further instructions.

Figure 2:
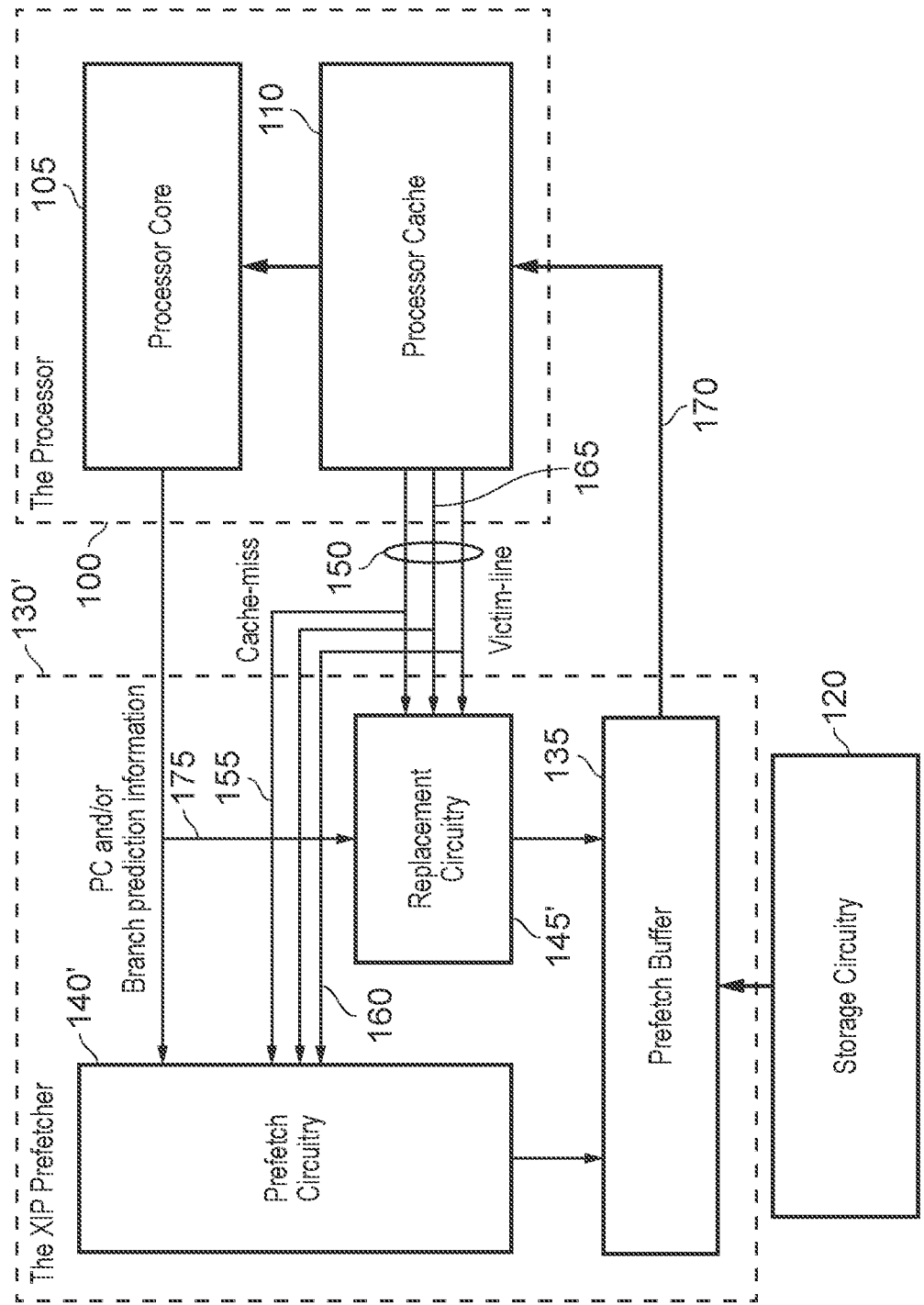

Another example is illustrated schematically in FIG. 2. Here, further information 175 is provided from the processor core 105 to prefetch circuitry 140' and to replacement circuitry 145' within an XIP prefetcher 130'. The information 175 is referred to as program flow information from the processing circuitry 100 and may be embodied, for example, as an indication of previously executed program instructions and a prediction of future program instructions to be executed. Therefore, the program flow information can indicate at least a predictive next instruction address and the prefetch circuitry 140' may be configured to selectively control fetching of program instructions from a set of one or more addresses (for example, a so-called cache line) starting at the predicted next instruction address, or alternatively including the predicted next instruction address. The prefetch circuitry itself 140' may store information relating to previously executed program instructions, as may be replacement circuitry 145, so that one or both of the prefetch circuitry 140' and the replacement circuitry 145' may be configured so that one or both of a selection operation by the prefetch circuitry 140' of a next program instruction for prefetching and a deletion operation by the replacement circuitry 145' to delete an instruction from the prefetch buffer 135 is dependent upon previously executed program instructions and the prediction of future program instructions to be executed.

In general, the information 175 may comprise one or more of branch prediction information indicating a branch target address; and program counter (PC) information indicating one or more next successive program instructions for execution.

In examples of these techniques with relation to FIG. 2, the prefetch circuitry 140' may use line-based branch prediction from the processor core 105, for example including a branch taken predictor, a direction predictor, a target predictor, and (when this information becomes available) a prediction result. In the case of no branch being detected or predicted, a default may be a prediction of sequential forward program flow.

A branch-predicted target line may be prefetched if the prediction probability is at least a threshold probability (for example, in a branch predictor "strongly taken" or "strongly not taken" and if the line is predicted by the prefetch circuitry to be missed at the processor cache 110. For example, if the previous branch target missed at the processor cache, a sequential next line may be predicted to be missed at the cache as well. In another example, a predicted backward branch taken line may be expected to be a hit at the processor cache 110. A register-based unconditional branch may be expected to be a miss at the cache.

Figure 3:
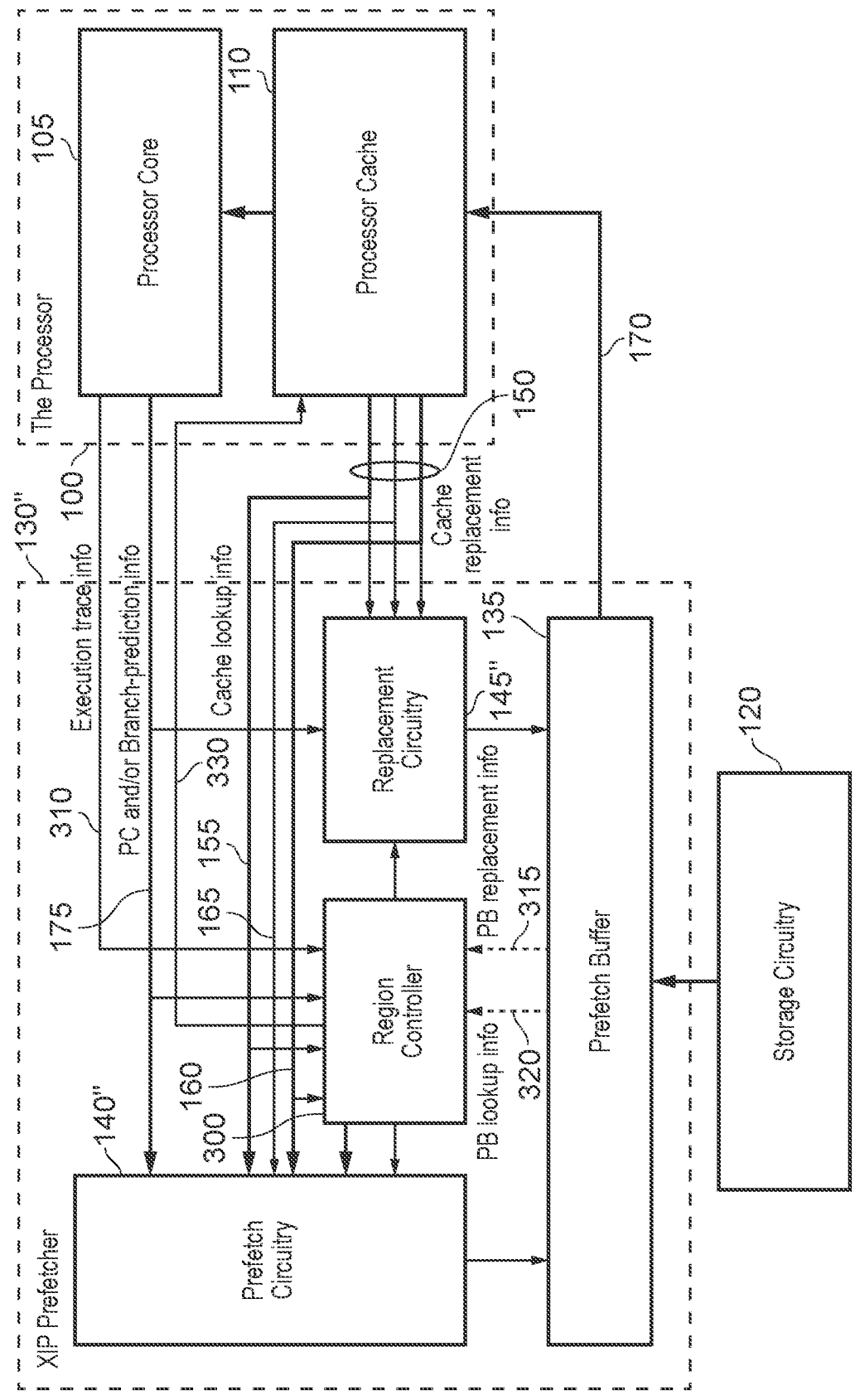

Now referring to FIG. 3, techniques referring to so-called locality profiling will be described. Here, in the context of an XIP prefetcher 130" having prefetch circuitry 140", replacement circuitry 145" and so on, a region controller 300 which may also be referred to as a so-called locality profiler, is provided. The region controller 300 generates a current address region (which may also be referred to as a "locality realm") and various probability values indicative of a locality trend.

The locality realm may be defined as an imaginary boundary of a program execution space in which the majority portion of program execution within a certain period of time falls. The locality realm can be derived from the various information 150, 175 described above, optionally along with execution trace information 310 from the processor core 105; cache replacement information and cache lookup information and also prefetch buffer replacement information 315 and prefetch buffer lookup information 320 within the XIP prefetcher 130".

In operation, the region controller generates the current address region (locality realm) having at least the threshold probability of containing one or more next program instructions in dependence upon one or both of the cache operation information referred to above and the program flow information referred to above.

The locality trend information also generated by the region controller may include a first probability value, a locality mobility, representing a probability that the locality realm shifts within the address space along with the prefetch request; and a second probability value, a locality stickiness, which is a probability that the locality realm stickily encompasses the cache line supplied by the XIP prefetcher or a cache line evicted from the processor cache 110 (which may actually be represented by two respective stickiness indices in some examples).

In other words, the locality mobility may be expressed as a first probability value indicative of the probability that the current address region changes in response to a given prefetch operation, and the locality stickiness may be expressed as a second probability value indicative of the probability that one or both of a newly prefetch program instruction and a program instruction evicted from the cache lies within the current address region. A way in which these probability values may be used is firstly to generate a weighting arrangement. Here, the prefetch circuitry 140″ is configured to generate a respective weighting for each of at least (i) a first candidate next program instruction for prefetching based on the program flow information; and (ii) a second candidate next program instruction for prefetching based on the cache operation information. The prefetch circuitry 140″ selectively controls prefetching independence upon one of the first and second candidate next program instructions for prefetching according to the respective weightings.

The prefetch circuitry 140″ can also (optionally) generate a weighting for a third outcome, which is not to prefetch an instruction at all at this prefetch cycle.

The region controller 300 is configured to vary the respective weightings associated with the first and second candidate next program instructions for prefetching (and/or indeed a weighting the optional third outcome) in dependence upon the first probability value and/or independence upon the second probability value.

FIG. 4 schematically illustrates an example technique by which the region controller 300 is configured to adjust the first probability value ("mobility") applicable to a next prefetching operation in response to a current instance of the program flow information and cache operation information. Here, respective columns indicate branch prediction information as an example of the program flow information, cache lookup information as an example of the cache operation information, prefetch buffer lookup information 320, the current mobility value (which need not be specified in this table because relative changes are indicated in a final column entitled "next mobility".

Referring to a row 400, for strong branch prediction and a cache miss along with a prefetch buffer miss, the next mobility is higher than the current mobility. In a row 410, for weak branch prediction and a cache miss the next mobility is unchanged with respect to the current mobility. Referring to a row 420, for strong branch prediction and a cache hit the next mobility is lower than the current mobility. Finally, for a row 430, for strong branch prediction and a cache miss and a prefetch buffer hit the next mobility is unchanged.

Similarly, with reference to FIG. 5, the region controller may adjust the second probability value (stickiness) applicable to a next prefetching operation in response to a current instance of the program flow information and the cache operation information.

Therefore, one or both of mobility and stickiness can depend on the cache information and the program flow information, and in turn, operations of prefetching and/or eviction (replacement) for the prefetch buffer can depend on mobility and stickiness.

Referring to a row 500, for an execution trace 310 indicating a prediction hit, a cache miss, a prefetch buffer hit, and a cache eviction, the stickiness is adjusted to be higher in respect of a next prefetching operation.

For a row 510, where a prediction miss is indicated by the indication trace information 310, the cache misses but the prefetch buffer hits and there is cache eviction, the next stickiness is unchanged.

In a row 520, where both the cache and prefetch buffer miss and there is cache eviction, the next stickiness is lower.

Finally, in a row 530, where the cache and the prefetch buffer both miss but there is no cache eviction the next stickiness is higher.

In further example arrangements, the locality information derived by the region controller 300 can be provided back to the processor cache 110 by a data path 330. For example, the locality mobility and stickiness may be provided to the processor cache associated with supplying cache lines. Examples of the use of such information may be that the cache memory is configured to vary its operation in response to the received one or both of the first and second probability values. For example, the processor cache 110 controller's state or algorithm can be varied in response to the first and second probability values. In another example, to mitigate so-called thrashing from a set in the processor cache, for a second probability value (stickiness) of at least a threshold probability, the cache memory 110 may be configured not to cache a program instruction in the current address region. In other words, thrashed lines usually have a high locality stickiness in the prefetch buffer so that an allocation policy at the processor cache 110 can be changed to "not allocated" in response to such a high locality stickiness.

In other examples, the cache memory 110 may be configured to vary a replacement algorithm controlling replacement of program instructions stored in the cache memory in response to the first probability value (mobility). Here, cache replacement can also be considered as a prediction of a locality realm shifting from the processor cache itself, so that the replacement control state can be weighted with the mobility value for potentially better accuracy.

Figure 6:
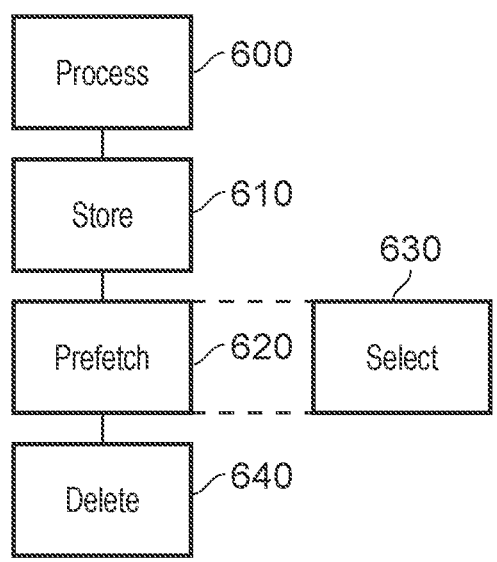
FIGS. 6 and 7 are schematic flowcharts illustrating respective methods.

FIG. 6 is a schematic flowchart illustrating a method comprising:

processing (at a step 600) program instructions, in which the program instructions are stored by storage circuitry and the processing step comprises executing the program instructions in place from the storage circuitry;

storing (at a step 610) in a prefetch buffer, program instructions for execution by the processing step;

prefetching (at a step 620) program instructions to the prefetch buffer, the prefetching step including selecting (at a step 630) a next instruction for prefetching; and deleting (at a step 640) instructions from the prefetch buffer to provide storage for newly prefetched program instructions;

in which one or both of the selecting step and the deleting step is dependent upon previously executed program instructions and a prediction of future program instructions to be executed.

Figure 7:
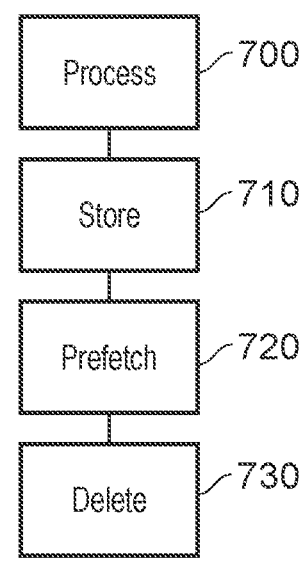

FIG. 7 is a schematic flowchart illustrating a method comprising:

processing (at a step 700) program instructions, in which the program instructions are stored by storage circuitry and the processing step comprises executing the program instructions in place from the storage circuitry and storing program instructions for execution in a cache memory;

storing (at a step 710) in a prefetch buffer, program instructions for execution by the processing step;

prefetching (at a step 720) program instructions to the prefetch buffer, the prefetching step comprising selectively controlling prefetching of program instructions from a set of one or more addresses; and deleting (at a step 730) instructions from the prefetch buffer to provide storage for newly prefetched program instructions;

in which:

the prefetching step comprises receiving cache operation information indicating at least a subset of operations for the cache memory; and one or both of the prefetching step and the deleting step is dependent upon the cache operation information.

By way of example, one or both of the prefetch circuitry and the replacement circuitry may be configured so that one or both of a selection operation by the prefetch circuitry of a next program instruction for prefetching, and a deletion operation to delete an instruction from the prefetch buffer by the replacement circuitry is dependent upon the cache operation information.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:

processing circuitry comprising a cache memory;

prefetch circuitry coupled with the cache memory, the prefetch circuitry configured to:

receive cache operation information from the processing circuitry, the cache operation information indicating a plurality of types of operations performable on the cache memory, the plurality of types of operations including a first type of operation and a second type of operation; and selectively control prefetching of program instructions from a set of addresses from a current address region in the cache memory based at least on the cache operation information, previously executed program instructions, and a prediction of future program instructions to be executed; and a region controller circuitry configured to determine (i) a first probability value indicating a first likelihood that the current address region shifts in response to execution of the first type of operation and (ii) a second probability value indicating a second likelihood that the second type of operation to be fetched from the cache memory is within the current address region in the cache memory, wherein the cache memory is configured to vary operations in accordance with at least one of the first probability value or the second probability value.

2. The circuitry according to claim 1, wherein the plurality of types of operations indicated by the cache operation information includes at least one of:

cache miss prefetch by the processing circuitry;

cache eviction operations to evict currently stored contents of the cache memory;

successful cache retrieval operations by the processing circuitry; and a cache replacement control state.

3. The circuitry according to claim 2, wherein the prefetch circuitry is further configured to generate a respective weighting for each of at least (i) a first candidate next program instruction for prefetching based on program flow prediction information and (ii) a second candidate next program instruction for prefetching based on the cache operation information, and to selectively control prefetching in dependence upon one of the first and second candidate next program instructions for prefetching in dependence upon the respective weightings.

4. The circuitry according to claim 3, wherein the region controller circuitry is further configured to generate the current address region having at least a threshold probability of containing one or more next program instructions in dependence upon at least one of:

the cache operation information; and program flow information.

5. The circuitry according to claim 4, wherein the region controller circuitry is further configured to:

generate the first probability value indicative of the first likelihood that the current address region shifts in response to a given prefetch operation; and assign the respective weightings associated with the first and second candidate next program instructions for prefetching based at least on the first probability value.

6. The circuitry according to claim 5, wherein the region controller circuitry is further configured to adjust the first probability value applicable to a next prefetching operation in response to a current instance of the program flow prediction information and the cache operation information.

7. The circuitry according to claim 4, wherein the region controller circuitry is further configured to:

generate the second probability value indicative of the second likelihood that at least one of a newly prefetched program instruction and a program instruction evicted from the cache memory lies within the current address region; and assign the respective weightings associated with the first and second candidate next program instructions for prefetching based at least on the second probability value.

8. The circuitry according to claim 7, wherein the region controller circuitry is further configured to adjust the second probability value applicable to a next prefetching operation in response to a current instance of the program flow prediction information and the cache operation information.

9. The circuitry according to claim 4, wherein the region controller circuitry is further configured to provide at least one of the first probability value or the second probability value to the cache memory.

10. The circuitry according to claim 9, wherein, for the second probability value of at least a threshold probability, the cache memory is configured not to cache a program instruction in the current address region.

11. The circuitry according to claim 9, wherein the cache memory is further configured to vary a replacement algorithm controlling replacement of program instructions stored in the cache memory in response to the first probability value.

12. The circuitry according to claim 1, wherein the cache memory is further configured to store and to evict program instructions as groups of program instructions; and
 wherein the prefetch circuitry is further configured to prefetch program instructions as groups of program instructions.

* * * * *